(12) United States Patent
Chang

(10) Patent No.: US 6,397,266 B1
(45) Date of Patent: May 28, 2002

(54) INPUT/OUTPUT CONTROL DEVICE FOR REDUCING STANDBY TIME OF THE CPU

(75) Inventor: Nai-Shung Chang, Yung-Ho (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/235,640

(22) Filed: Jan. 22, 1999

(30) Foreign Application Priority Data

Oct. 20, 1998 (TW) ........................................ 87117296 A

(51) Int. Cl.$^7$ .................................................. G06F 13/00
(52) U.S. Cl. .................................. 710/1; 710/5; 710/32
(58) Field of Search ................................ 710/1, 3, 5, 8, 710/52, 126, 129, 58, 22, 7, 31, 32, 36

(56) References Cited

U.S. PATENT DOCUMENTS

| | | | | |
|---|---|---|---|---|
| 4,766,530 A | * | 8/1988 | Roslund | 364/200 |
| 5,043,878 A | * | 8/1991 | Ooi | 364/200 |
| 5,390,329 A | * | 2/1995 | Gaertner et al. | 395/650 |
| 5,394,541 A | * | 2/1995 | Chesley et al. | 395/550 |
| 5,630,093 A | * | 5/1997 | Hozhammer et al. | 711/115 |
| 5,793,993 A | * | 8/1998 | Broedner et al. | 710/126 |
| 5,983,051 A | * | 11/1999 | Mishima et al. | 339/83 |
| 6,012,118 A | * | 1/2000 | Jayakumar et al. | 710/126 |
| 6,131,111 A | * | 10/2000 | Yoshino et al. | 709/204 |
| 6,170,060 B1 | * | 1/2001 | Mott et al. | 713/201 |
| 6,223,238 B1 | * | 4/2001 | Meyer et al. | 710/129 |

* cited by examiner

Primary Examiner—Thomas Lee
Assistant Examiner—Rijue Mai
(74) Attorney, Agent, or Firm—J. C. Patents

(57) ABSTRACT

An input/output control device used to enhance the efficiency of accesses to input/output devices in a computer system is provided. The input/output control device includes a means for storing a mapping table containing pairs of address and response time data associated with the input/output control devices, respectively. When a central processing unit (CPU) accesses an input/output device, a ready signal RDY or a defer signal DEFER is transmitted to the central processing unit from the input/output control device according to a response time corresponding to the accessed input/output device. Thus, the standby time of the central processing unit is greatly reduced, resulting in a better efficiency for the entire computer system.

12 Claims, 2 Drawing Sheets

| I/O Address | Response Time |
|:---:|:---:|
| 40H | 8 |
| 60H | 45 |
| ⋮ | ⋮ |

FIG. 3

INPUT/OUTPUT CONTROL DEVICE FOR REDUCING STANDBY TIME OF THE CPU

CROSS-REFERENCE TO RELATED APPLICATION

This application claims the priority benefit of Taiwan application serial no. 87117296, filed Oct. 20, 1998, the full disclosure of which is incorporated herein by reference.

BACKGROUND OF THE INVENTION

1. Field of the Invention

The invention relates to an input/output (I/O) control device, and in particular to an input/output control device used to enhance the efficiency of accessing input/output devices in a computer system.

2. Field of the Related Art

Due to great progress in the semiconductor technology, computer, an indispensable apparatus, has been widely used in out daily life.

Referring to FIG. 1, a general personal computer is presented. In FIG. 1, a computer system 100 includes a central processing unit (CPU) 110, a chipset 120, a memory 130 and a plurality of input/output (I/O) devices 151–15N electrically connected to a bus 140.

It is well-known that the CPU 110, a heart of the computer system 100, is responsible for all operations. Most control circuits in the computer system 100 all are integrated in the chipset 120 except for the CPU 110. The chipset 120 is used to control the communications between the CPU 110 and other devices, such as accesses to the memory 130 or the I/O devices 151–15N. The memory 130 can be used to store programs and data provided to the CPU 110 for operations. The I/O devices 151–15N, such as hard disk for store a great amount of data, printer, mouse, keyboard, scanner and the like, are electrically connect to the CPU 110 via the chipset 120.

In an ordinary computer system, the access speed of a memory is faster then those of I/O devices. In addition, the I/O devices electrically connected to the same computer system are various and have different access speeds. To handle the I/O devices with different access speeds, the CPU separately executes instructions for the accesses to the memory and the I/O devices.

In an early adopted method as shown in FIG. 1, the CPU 110 has a first input terminal for receiving a ready signal RDY. When the CPU 110 accesses an I/O device, the I/O device can inform the CPU 110 with the ready signal RDY that data required by the CPU 110 is ready or the I/O device has received data from the CPU 110. Thus, the CPU 110 can communicate well with the I/O devices having different access speeds.

Furthermore, in line with great progress in the semiconductor technology, a large number of devices has been contained in a single chip, resulting in more complicated functions and a higher speed of a CPU. For example, with pipeline technique, a CPU almost can execute an instruction within one clock cycle, or a form of branch predication is used to previously determine a flow of program execution. Moreover, refreshing the program codes and data of a pipeline help speed up the operation speed of the CPU. On the other hand, a multi-thread, multi-task operating system can completely function well because the capability of hardware operations is enhanced. Therefore, several tens of processes can be concurrently executed in turn in a short time by completely using the capability provided by the hardware.

Although the operation capability and speed of a CPU are greatly increased, the access speeds of I/O devices has not increased yet. Therefore, only using the ready signal RDY to control the accesses to the I/O devices could result in a lower efficiency for the entire computer system if the access speeds of the I/O devices are slower. As shown in FIG. 1, to overcome this problem, the CPU 110 further provides a second input terminal for receiving a defer signal DEFER. When an I/O device being accessed by the CPU 110 has a lower access speed, the I/O device can transmit the defer signal DEFER instead of the ready signal RDY in response to the CUP 110 after receiving a control instruction from the CPU 110. Following receiving the defer signal DEFER by the CPU 110, the CPU 110 does not execute any instruction associated with the I/O device temporarily. Instead, the CPU executes other instructions independent of the I/O device. After a default time, the CPU 110 continuously proceeds an instruction associated with the I/O device. If the I/O device can not complete an operation requested by the CPU 110, a corresponding defer signal DEFER is again transmitted to the CPU 110 within the default time to inform that the I/O device has not completed the requested operation yet. The defer signal DEFER is maintained until the I/O device already completes the requested operation. However, if the CPU 110 does not receive another defer signal DEFER within the default time after the previous defer signal DEFER, it shows that the I/O device has completed a data access.

Moreover, in the computer system 100, the CPU 110 communicates with the I/O devices 151–15N via the chipset 120. When the CPU 110 transmits/receives data to/from one of the I/O devices 151–15N, the chipset 120 sends out a corresponding ready signal RDY or defer signal DEFER according to the access speed of the I/O device. In practical, it takes more time to send the defer signal DEFER in response to the CPU 110. For example, Intel Pentium II CPU takes 6 clock cycles to handle the defer signal DEFER in a form of complicated control. Every period of time, the CPU repeats the same operation. To overcome this problem, in the prior art, when the CPU 110 accesses an I/O device, the chipset 120 first transmits a ready signal DRY to the CPU for response. If the I/O device to communicate with the CPU 110 has not completed an appointed operation yet within a default time, the chipset 120 sends a defer signal DEFER in response to the CPU until the I/O device already completes the appointed operation.

As can be obviously seen from the above, the chipset 120 first sends a ready signal RDY in response to the CPU, regardless of the access speed of the I/O device being accessed by the CPU. After a default time, the chipset 120 sends a defer signal DEFER to the CPU 110 instead of a ready signal RDY Of course, the CPU does not take much time for standby, if the I/O device accessed by the CPU completes a data access within the default time. However, if the accessed I/O device can not complete the data access within the default time, the chipset 120 alternatively sends a defer signal DEFER in response to the CPU. In this case, the CPU 110 vainly wastes the standby time before receiving the defer signal DEFER, leading to a low efficiency for the entire computer system.

SUMMARY OF THE INVENTION

In view of the above, an object of the invention is to provide an input/output (I/O) control device with a means for storing a mapping table which contains pairs of address and response time associated with the I/O devices, respectively. When a CPU accesses one of the I/O devices, the I/O control device responds the CPU with a ready signal RDY or a defer signal DEFER according to the response time of the I/O device, thereby reducing the standby time of the CPU and increasing the efficiency of the entire computer system.

To achieve the above-stated object, the I/O control device used to control the accesses to a plurality of input/output devices by a central processing unit (CPU) in a computer system, comprises a means for storing a mapping table containing pairs of address and response time data associated with the input/output devices, respectively. When an input/output device is accessed by the central processing unit, the input/output control device locates a corresponding response time from the mapping table according to an address of the accessed input/output device. If the located response time is more than a default time, the input/output control device defers a communication between the central processing unit and the input/output device in a form of defer control. Inversely, if the located response time is less than the default time, the input/output control device builds a communication between the central processing unit and the input/output device in a form of general control.

BRIEF DESCRIPTION OF THE DRAWINGS

The invention will become more fully understood from the detailed description given hereinbelow and the accompanying drawings which are given by way of illustration only.

FIG. 3 is a mapping table containing pairs of address and response time data associated with I/O devices according to the invention.

DETAILED DESCRIPTION OF THE PREFERRED EMBODIMENTS

Figure 1:
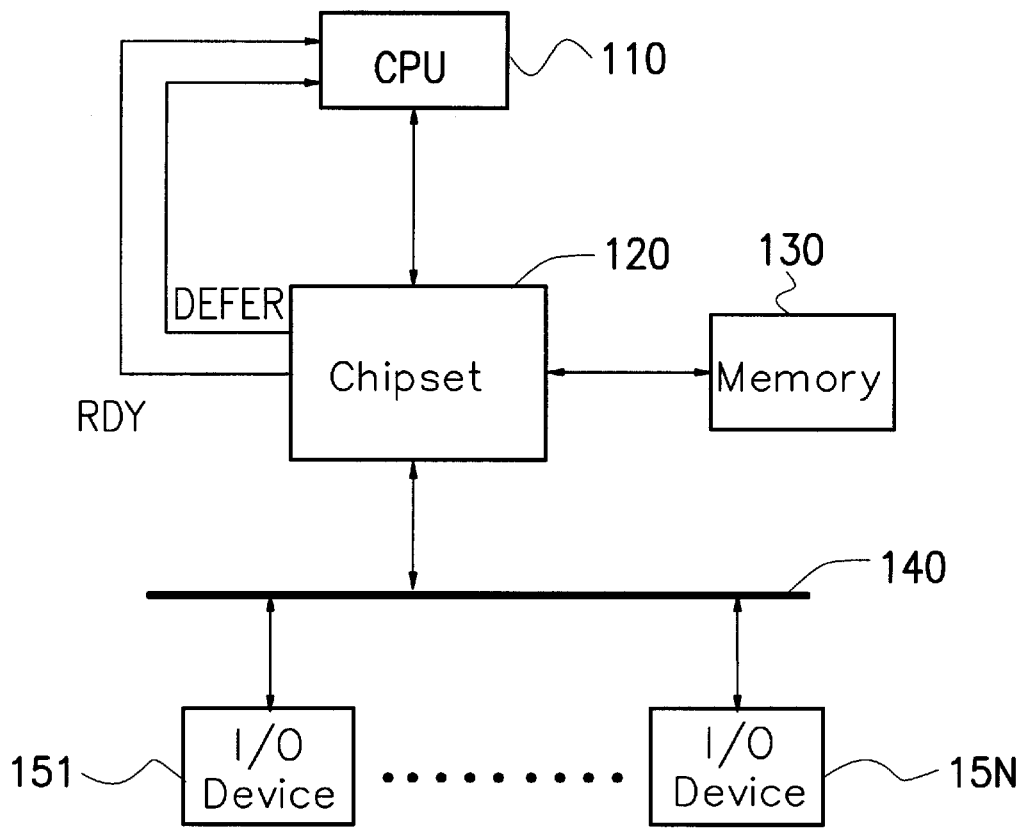
FIG. 1 is a block diagram showing a general personal computer.
Figure 2:
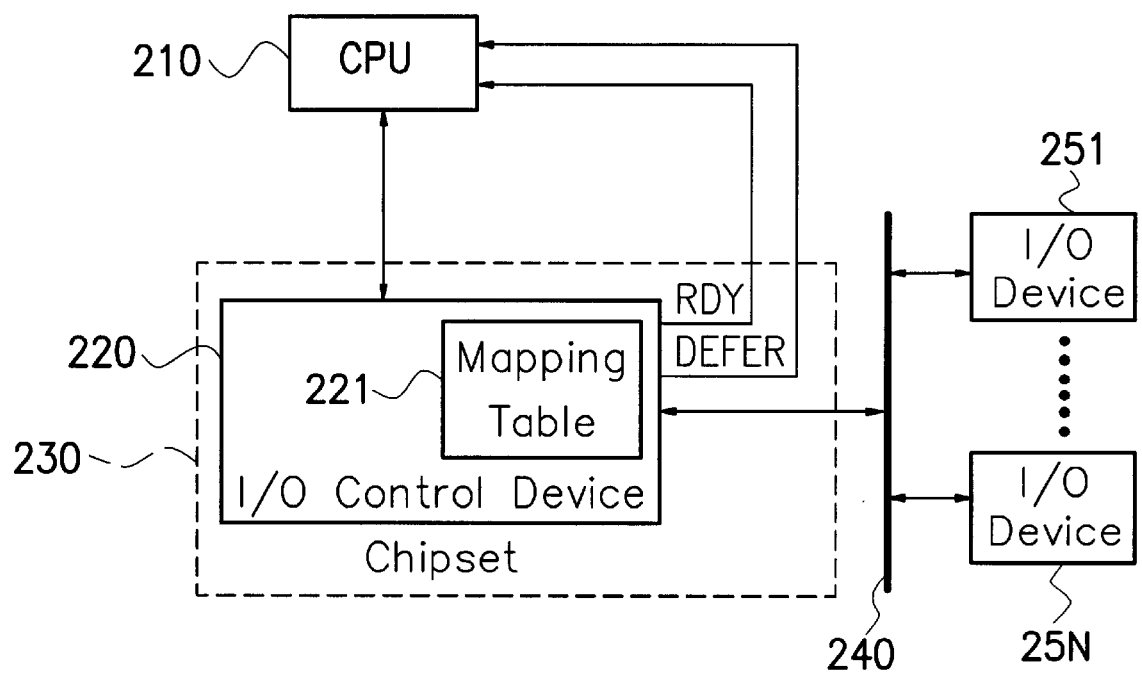
FIG. 2 is a block diagram showing an input/output control device and a computer using the same according to the invention.

FIG. 2 is a block diagram showing an input/output (I/O) control device 220 and a computer system using the same according to the invention. As shown in FIG. 2, the I/O control device 220 is built in a chipset 230 and used in the computer system 200. Most of other control circuits (not shown) are integrated into the chipset 230 except for a CPU 210. The computer system 200 further includes a plurality of I/O devices 251–25N electrically connected to a bus 240. The CPU 210 accesses the I/O devices 251–25N via the I/O control device.

The accesses to the I/O devices 251–25N by the CPU 210 are controlled by a ready signal RDY and a defer signal DEFER. The ready signal RDY is used to inform the CPU that one of the I/O devices 251–25N accessed by the CPU has completed an appointed operation. The defer signal DEFER is used to inform the CPU to defer the access to the I/O device for a period of time. IF the I/O device can not complete the appointed operation before re-accessing the I/O device by the CPU 210, the I/O control device 220 re-sends a defer signal DEFER in response to the CPU 210. Currently, Intel Pentium II CPU has possessed a function to receive a ready signal RDY and a defer signal DEFER. Other types of CPUs with the same function can also be used in the invention.

The I/O control device 220 includes a means (not shown) for storing a mapping table 221 containing pairs of address and response time data associated with the I/O devices, respectively. All the data on the mapping table 221 can be set by a basic input/output system (BIOS) program in the computer system 200.

When the CPU 210 transmits/receives data to/from one of the I/O devices 251–25N, the I/O control device 220 first locates a corresponding response time from the mapping table 221 according to an address associated with the I/O device output from the CPU 210. If the located response time is more than a default time, the input/output control device defers a communication between the central processing unit and the accessed input/output device in a form of defer control, i.e., a defer signal DEFER is transmitted in response to the CPU 210. Oppositely, if the located response time is less than the default time, the input/output control device builds a communication between the central processing unit and the accessed input/output device in a form of general control, i.e., a ready signal RDY is transmitted in response to the CPU 210. The default time can be set by the BIOS program in the computer system 200.

Figure 3:
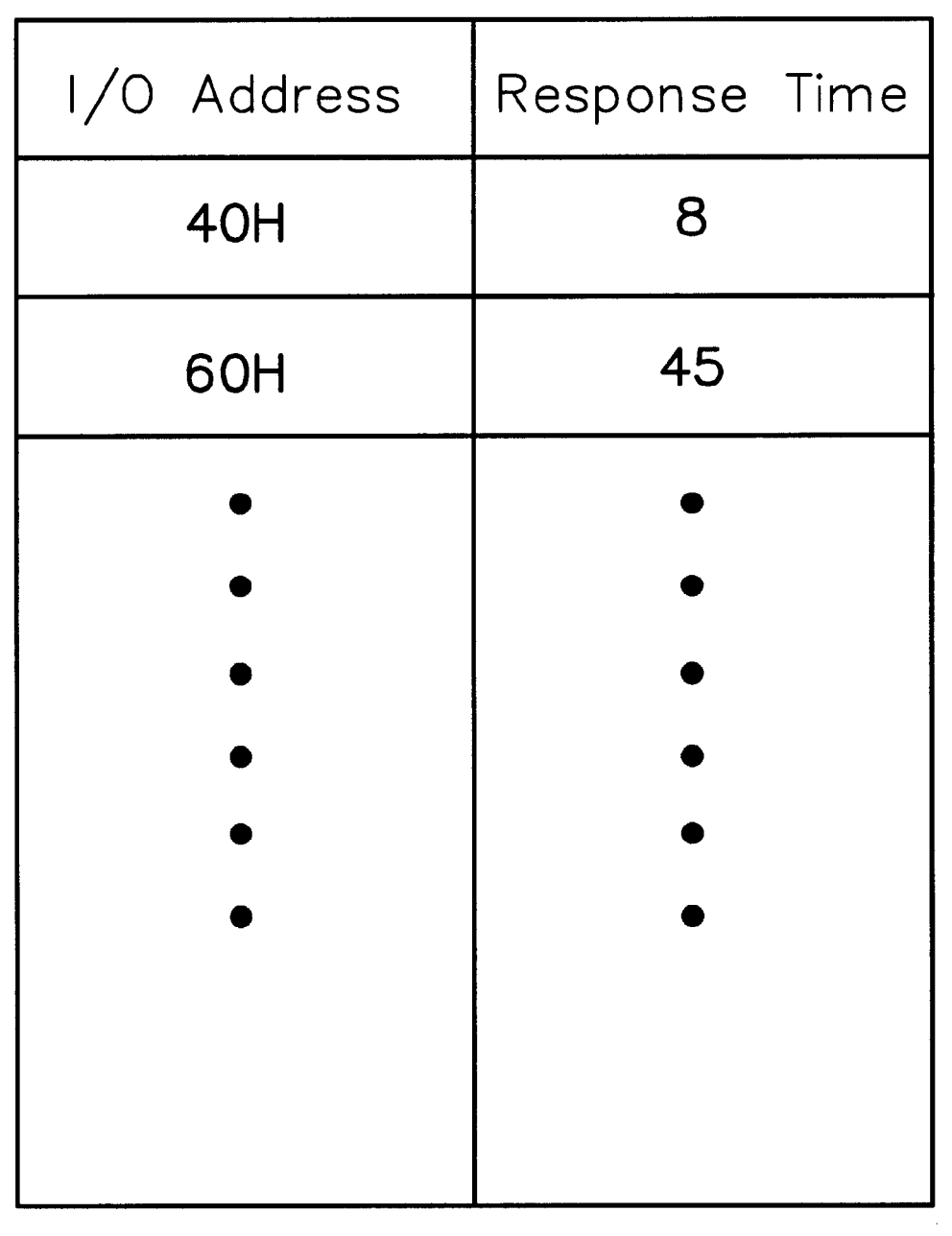

FIG. 3 is a schematic mapping table stored in a means (not shown) which is included in the I/O control device 220, containing pairs of address and response time data associated with the I/O devices 251–25N, respectively, according to the invention.

Referring to FIG. 3, two columns on the mapping table present I/O address and response time data, respectively. The size of the mapping table depends on a practical design and the number of I/O devices. As an example, only two pairs of address and response time data are shown. One pair shows 40H and 8 clock cycles; the other pair shows 60H and 45 clock cycles, wherein H represents a hexadecimal symbol. That is, an I/O device with an address of 40H has a response time of 8 clock cycles while an I/O device with an address of 60H has a response time of 45 clock cycles. The unit of the response time can also be $\mu s$ ($10^{-6}$ sec), ns ($10^{-9}$ sec) or the like. Assume that the I/O control device 220 is set to transmit a ready signal RDY in response to the CPU 210 if an response time corresponding to an accessed I/O device is less than 20 clock cycles, and to transmit a defer signal DEFER in response to the CPU 210 for deferring the communication between the accessed I/O device and the CPU 210 if the response time is more than 20 clock cycles.

Under this circumstance, when the CPU 210 accesses an I/O device with an address of 40H and a corresponding response time of 8 clock cycles less than 20 clock cycles, the I/O control device 220 transmits a ready signal RDY in response to the CPU 210. On the contrary, when the CPU 210 accesses an I/O device with an address of 60H and a corresponding response time of 45 clock cycles more than 20 clock cycles, the I/O control device 220 transmits a defer signal DEFER in response to the CPU 210.

In summary, a CPU in a computer system can access I/O devices by the control of an I/O control device of the invention, wherein the I/O control device includes a means for storing a mapping table containing pairs of address and response time data associated with the I/O devices, respectively. The address and response time data can be set by the BIOS program. When the CPU accesses any one of the I/O devices, the I/O control device, if an response time corresponding to an address associated with the accessed I/O device is more than a default time, transmits a defer signal DEFER in response to the CPU. Inversely, the I/O control device transmits a ready signal READY in response to the CPU if the response time less than the default time.

As compared with the prior art, the I/O control device of the invention has the following advantage. The I/O control device can determine an appropriate control way according to a default mapping table. Thug, the CPU can not consume much more time for standby, resulting in a high efficiency for the entire computer system.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An input/output (I/O) control device used to control accesses to a plurality of input/output devices by a central processing unit (CPU) in a computer system, the input/output control device comprising:

means for storing a mapping table containing pairs of address and response time data associated with the input/output devices, respectively, wherein when an input/output device is accessed by the central processing unit, the input/output control device locates a corresponding response time from the mapping table according to an address associated with the input/output device; if the located response time is more than a default time, the input/output control device defers an access to the input/output device in a form of defer control; and if the located response time is less than the default time, the input/output control device proceeds an access to the input/output device.

2. The input/output control device as recited in claim 1, wherein the computer system includes a basic input/output system (BIOS) program by which the means for storing a mapping table is set.

3. The input/output control device as recited in claim 2, wherein the default time is set by the basic input/output system program.

4. An input/output control device used to control accesses to a plurality of input/output devices by a central processing unit in a computer system, the input/output control device comprising:

means for storing a mapping table containing pairs of address and response time data associated with the input/output devices, respectively, wherein when an input/output device is accessed by the central processing unit, the input/output control device locates a corresponding response time from the mapping table according to an address associated with the input/output device; if the located response time is more than a default time, the input/output control device transmits a first signal to allow the central processing unit to defer an access to the input/output device until the first signal is terminated; and if the located response time is less than the default time, the input/output control device transmits a second signal to allow the central processing unit to proceed an access to the input/output device until the second signal is terminated.

5. The input/output control device as recited in claim 4, wherein the computer system includes a basic input/output system program by which the means for storing a mapping table is set.

6. The input/output control device as recited in claim 5, wherein the default time is set by the basic input/output system program.

7. The method of claim 4, wherein the first signal is a defer signal (DEFER).

8. The method of claim 4, wherein the second signal is a ready signal (RDY).

9. A chipset capable of controlling accesses to a plurality of input/output devices by a central processing unit (CPU) in a computer system, the chipset comprising:

an I/O control device having a mapping table therein, and the mapping table containing pairs of address and response time data corresponding to the input/output devices respectively, wherein when an input/output device is accessed by the central processing unit, the input/output control device locates a corresponding response time from the mapping table according to an address associated with the input/output device; if the located response time is more than a default time, the input/output control device sends a defer signal to the CPU; and if the located response time is less than the default time, the input/output control device sends a ready signal to the CPU.

10. A method for controlling accesses to a plurality of input/output (I/O) devices by a central processing unit (CPU) in a computer system, wherein a mapping table contains pairs of address and response time data corresponding to the input/output devices respectively, the method comprising steps of:

locating a response time from the mapping table according to an address associated to one of the I/O device;

sending a defer signal to the CPU to defer a transaction of the I/O device if the located response time is larger than a default time; and sending a ready signal to the CPU to process a transaction of the I/O device if the located response time is less than the default time.

11. The method of claim 10, wherein the mapping table is set by a basic input/output system (BIOS).

12. The method of claim 10, wherein the default time is set by the BIOS.

* * * * *